(12) United States Patent
Ragnarsson

(10) Patent No.: US 8,162,150 B2
(45) Date of Patent: Apr. 24, 2012

(54) SEAFOOD GRADING APPARATUS

(75) Inventor: Egill Thor Ragnarsson, Gardabaer (IS)

(73) Assignee: Egill Thor Ragnarsson, Gardabaer (IS)

( * ) Notice: Subject to any disclaimer, the term of this patent is extended or adjusted under 35 U.S.C. 154(b) by 781 days.

(21) Appl. No.: 10/586,159

(22) PCT Filed: Jan. 14, 2005

(86) PCT No.: PCT/IS2005/000002
§ 371 (c)(1),
(2), (4) Date: Jul. 14, 2008

(87) PCT Pub. No.: WO2005/068094
PCT Pub. Date: Jul. 28, 2005

(65) Prior Publication Data
US 2008/0283453 A1  Nov. 20, 2008

(30) Foreign Application Priority Data
Jan. 16, 2004  (IS) .............................. 7117

(51) Int. Cl.
*B07B 13/00* (2006.01)
(52) U.S. Cl. ...................................... 209/665
(58) Field of Classification Search .................. 209/509, 209/606, 659, 660–666
See application file for complete search history.

(56) References Cited

U.S. PATENT DOCUMENTS

| 4,723,660 A | * | 2/1988 | Sjoberg ........................ 209/622 |
| 6,065,607 A | * | 5/2000 | Magnusson et al. .......... 209/665 |
| 6,321,914 B1 | * | 11/2001 | Magnusson et al. .......... 209/665 |

* cited by examiner

*Primary Examiner* — Joseph C Rodriguez
*Assistant Examiner* — Kalyanavenkateshware Kumar
(74) *Attorney, Agent, or Firm* — Finnegan, Henderson, Farabow, Garrett & Dunner LLP

(57) ABSTRACT

A grading apparatus for grading objects such as in particular fish or shrimp in respect of their size, comprising a plurality of juxtaposed substantially parallel endless conveyor belts (27), wherein the width (9) separating adjacent conveyor belts is larger at the unloading end (29) than at the loading end (28) of the belts and define sorting channels through which the items fall down when the channel width corresponds to the width of the item, each conveyor belt comprising a plurality of hinged segments with a sloping cross-section such that in between each adjacent pair of belts is formed a V-shaped valley with substantially continuous sloping sides (2), each side being at an angle in the range of about 70-85°.

11 Claims, 3 Drawing Sheets

2a 2b 4a      4b 5a      5b 6a      6b      6c

SEAFOOD GRADING APPARATUS

The invention concerns an apparatus for grading objects such as in particular delicate items such as fish or shrimp in respect of their size. The apparatus comprises juxtaposed substantially parallel endless conveyor belts formed by hinged segments with a sloping cross-section such that in between each adjacent pair of belts is formed a V-shaped valley with substantially continuous steep sloping sides.

TECHNICAL BACKGROUND

Many different technical solutions exist in the food processing industry for grading delicate objects such as fish and shrimp. For such objects, all mechanical treatment needs to be gentle but at the same time demands for high-throughput laboring processing, including sorting according to size, are ever increasing.

Currently available grading apparatus include ridge-belt machines, such as have been developed earlier by the present inventors and are disclosed in WO 96/41541 and WO 98/48951, the whole contents of which are included herein by reference. Other similar apparatus are described in U.S. Pat. No. 4,723,660 and Norwegian Patent No. 132917. Ridge belt machines comprise juxtaposed conveyor belts arranged such that the width of channels between adjacent belts is wider at the unloading end of the belts than at the loading end. The items to be sorted are loaded at the loading end of the conveyors and transported by the conveyors towards the unloading end. Means for loading evenly and suitably the Items on the loading end have been developed and are described, e.g. in WO 98/48951. The items will fall through the channels inbetween the belts when the width of the item is approximately the same as the width of the channel. Thus, smaller items will fall through the channels earlier while larger items are transported further along the conveyors before they fall through the channels. By using such machines, items such as capelin or sardine have been sorted with 5 m long conveyors into three to four different size grades but the accuracy of the grading is limited.

Conventional ridge belt sorting machines have some drawbacks though and have a limited grading resolution. Optimally, items such as whole fish or shrimp are sorted according to their nominal width measured across the body of the item lying on its back in a vertically symmetrical orientation, orthogonally to the central plane separating the left and right side of the substantially symmetrical item. However, if the item lies tilted in a sorting channel it will be sorted according to a tilted width which is larger than the nominal width, and thus the item will not fall down through the sorting channel until later. If the item has an Irregular shape, such as a shrimp, its "tilted width" can be substantially larger than its nominal width, as illustrated in FIG. 4. This problem of non-regular orientation of the items decreases the accuracy and possible resolution of the grading and means that graded batches may contain a substantial portion of under-size items, i.e. items that are conveyed too far along the sorting channel and fall through the channel too late and into a grade intended for larger items.

When a prior art ridge grading machine was tested, with 5 m long ridge belts forming sorting channels that are 8-18 mm wide (a width increase of 2 mm/m) 20-70% of items (capelin or shrimp) were irregularly positioned and such items were conveyed up to 60 cm further down the sorting channels than if they were oriented properly. This means that a substantial portion of the items will be sorted in an incorrect size batch.

SUMMARY OF INVENTION

The inventors have now surprisingly found that by providing ridge belts with substantially steep sides such that V-shaped open-bottom channels are formed in between adjacent belts width a channel angle in the range of about 12-40° (i.e., each side having an angle in the range of about 70-85°) much improved grading is achieved, as the items are oriented substantially more regularly (non-tilted) in the sorting channels.

A preferred embodiment of the apparatus of the invention has sorting channels with side walls having a slope of about 80°, i.e. a total channel angle of 20° between the two sides of a sorting channel formed between two ridge belts comprising a plurality of hinged segments each further comprising an open cleft. Such an apparatus with 5 m long conveyors can be used to grade items such as for example capelin or shrimp in many different size grades with much more accuracy than with conventional prior art ridge belt grading machines.

DETAILED DESCRIPTION

As mentioned, the apparatus of the invention is suited for grading delicate items such as capelin, sardines or shrimp, and may also be used for sorting of other delicate goods such as, but not limited to, herring, mackerel, menhaden, anchovy, horse mackerel, and blue whiting, as well as for oysters, clams and mussels as well as other products having similar characteristics.

Figure 5:
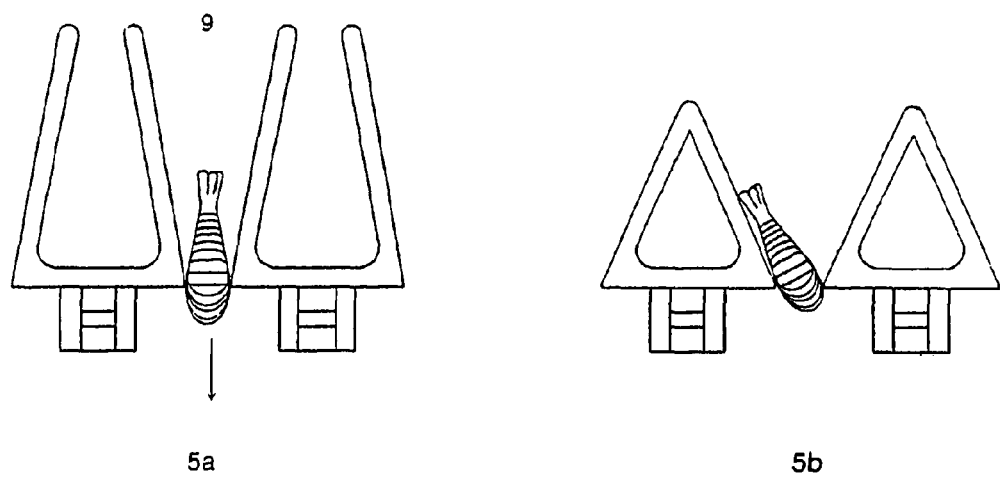
FIG. 5 illustrates the difference between a straight lying shrimp in a sorting channel according to the invention (5a) and in a prior art apparatus (5b).
Figure 6:
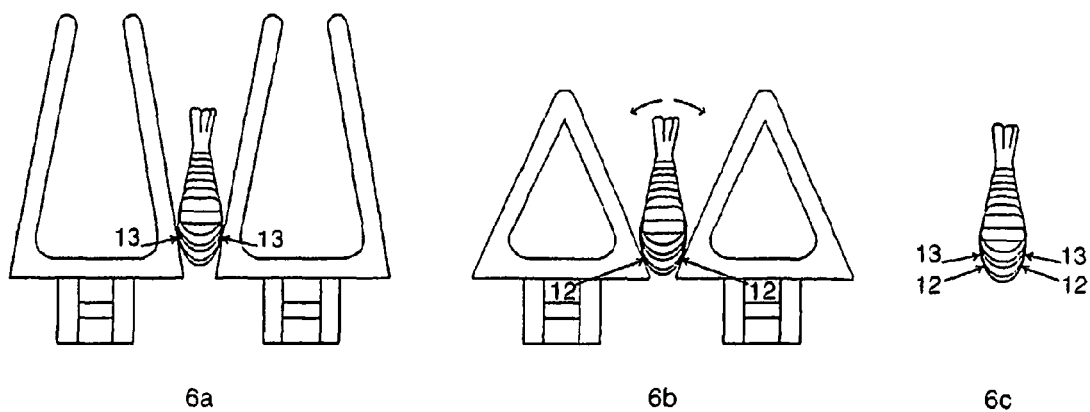
FIG. 6 shows the contact points between an item such as shrimp and the side walls of a sorting channel according to the invention (6a) and according to prior art (6b), (6c) clarifies the difference between the contact points.

The apparatus is particularly useful for grading of shrimp, either peeled or in the shell, whereas conventional prior art ridge belt grading machines are not suitable for grading of shrimp. As demonstrated in FIG. 5a, shrimp (15) have a tendency for being oriented vertically symmetrical in the steep sorting channels of the apparatus of the invention such that the measured width of the shrimp measured across the channel equals the nominal width (10) of the shrimp body. For comparison, a shrimp is shown in FIG. 5b lying in between two segments of a prior art ridge sorting machine. Such prior art segments have substantially less sloping sides, or about 60-65° forming a wider, more shallow channel, leaning towards one side of the channel such that the effective width of the shrimp is wider than the nominal width. The less steep sides cause the points of contact (12) between the shrimp and channel sides as illustrated in FIGS. 6b and 6c to be located further down closer to the back of the shrimp and further away from the center of gravity of the shrimp such that it is less stably oriented and has a much higher tendency to lean to its left or right side. FIG. 6a shows a shrimp lying in a sorting channel in an apparatus of the present invention, the contact points (13) between the shrimp and the channel sides are higher up on the sides of the shrimp such that the shrimp is more stably oriented.

As mentioned, the sorting channels according to the present invention preferably have a channel angle (7) in the range of about 10-40°, more preferably in the range of about 15-35°, and more preferably the range of about 20-30°. In particularly useful embodiments the sorting channels have a channel angle of about 20°. This would correspond to that the angle (8) of the sides of the channels is in the range of about 70-85°, and preferably in the range of about 70-80° and more preferably about 75-80°.

The apparatus of the present invention can use many different types of belts as long as they are shaped with the proper cross-section as described herein. In one embodiment continuous solid belts are used made from an elastic bendable material such that the belts can turn around the conveyor wheels (20). Such belts are made for example from extruded polymer/rubber mixtures. Optionally, such belts may have regularly distributed notches into the ridge of the belt to ease the bending of the belt around the conveyor wheels (20).

Figure 1:
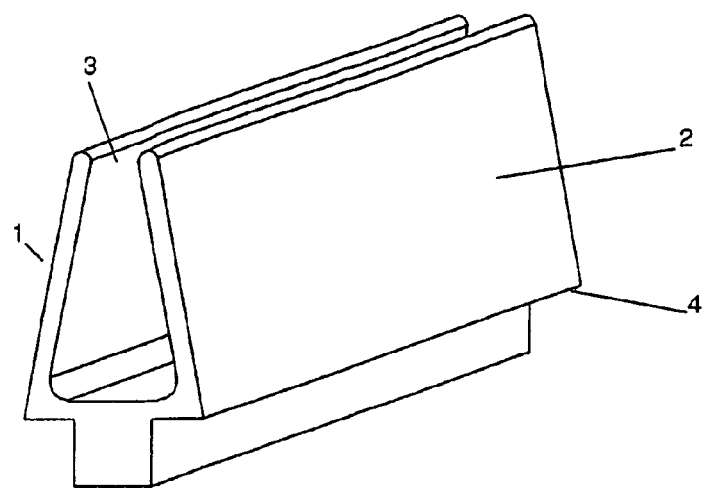
FIG. 1 shows a segment of a conveyor belt of the invention.
Figure 2:
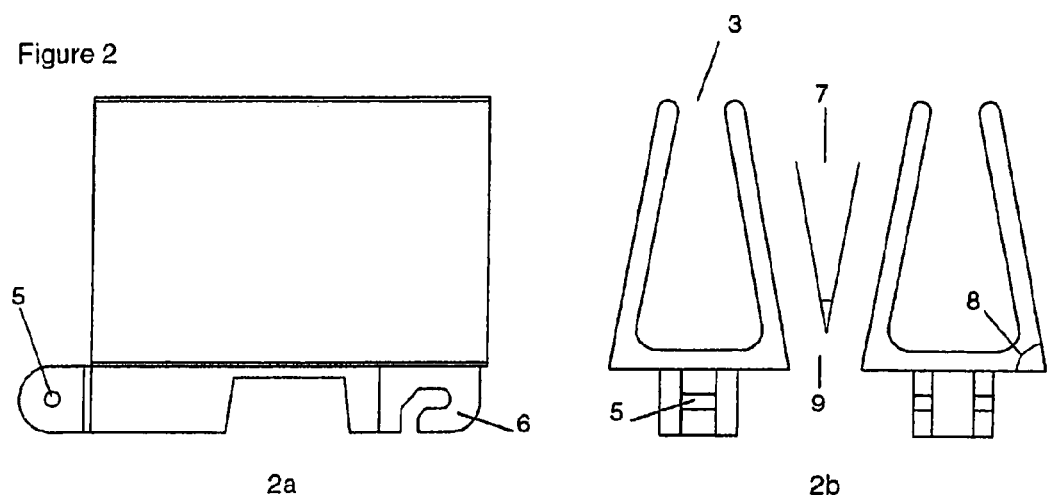
FIG. 2a is a side view of a segment and 2b shows the front and back of a segment.
Figure 3:
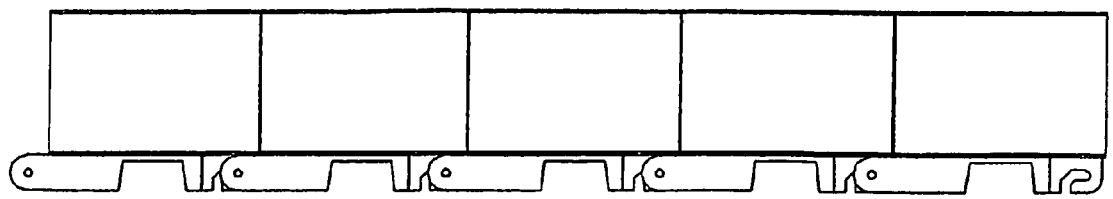
FIG. 3 shows five joined segments.
Figure 4:
FIG. 4 illustrates the difference between the measured width of items such as for example shrimp (4a) and capelin (4b) in a vertically symmetrical and a vertically tilted position.

Other preferred embodiments make use of belts comprised of hinged segments, such as shown in the accompanying FIGS. 1-3. Such segments can be made of any of a variety of food-industry compatible materials such as nylon and or HDPE (high density polyethylene).

In one embodiment of the apparatus of the invention each of said hinged segments has an open cleft (3) between the sloping sides, such as shown in FIGS. 1 and 2b. Such an open cleft substantially simplifies rinsing and washing of the conveyor belts. The open cleft further emphasise one important aspect of the Invention. The open cleft design allows decreased sid wall height, flexibility and adjustment of sidwall slope. In conventional ridge belts with segments that have closed ridges, impurities may get trapped inside the segments, which are difficult to remove with simple rinsing. The width of the cleft depends on the height of the sloping sides of the segment, typically the width is in the range of about 3-12 mm, such as in the range of about 3-10 mm, including the range of about 4-10 mm or the range of about 4-8 mm, or about 4, 5, 6, 7, 8, 9 or 10 mm.

The proportions (width and height) of the segments will depend on the items being sorted, as will the widths separating adjacent segments, i.e. the width of the sorting channel bottoms. Typically, for items such as capelin or shrimp, the height of the segments is in the range of about 5-9 cm, or in the range of about 6-8 cm, or about 5, 6, 7, 8, or 9 cm high. However, for sorting of larger objects such as, e.g., larger fish, different dimensions are used, e.g. having segments with a height in the range of about 10-20 cm, such as the range of about 10-15 cm. If such large-size segmented belts with open clefts on the ridge as described above, the width of the cleft will be correspondingly wider, keeping the same or similar proportions as described above for smaller belt segments.

The bottom edges (4) of the sloping sides (2) may be either sharp interfaces, round edges, or shaped with thin rims, e.g. approximately vertical 1-5 mm wide rims.

The sloping sides (2) of the segments/channels may be substantially flat and smooth, but can in alternative embodiments have a corrugated or wavy pattern, which could accommodate sorting of items with an irregular surface, such as for example fish with protruding eyes and/or fins.

The inclination of the ridge belts is typically in the range of about −5° to 25°, or about 0-10° such as in the range of about 4° to 10°, such as in the range of about 4° to 8°, or in the range of about 5° to 7°. Certain embodiments have a belt inclination in the range of about −3° to 0°, such as about −3° or about 0° (i.e., horizontal belts).

The segments may be coupled together in different ways such as by simple "hinges" (5, 6) as shown in FIG. 2a. Thus, the segments form essentially continuous ridge belts (27) as shown in FIG. 3 and can form endless loops that are guided by rails or belts around revolving wheels (20) that keep the ridge belts (27) in motion.

Figure 7:
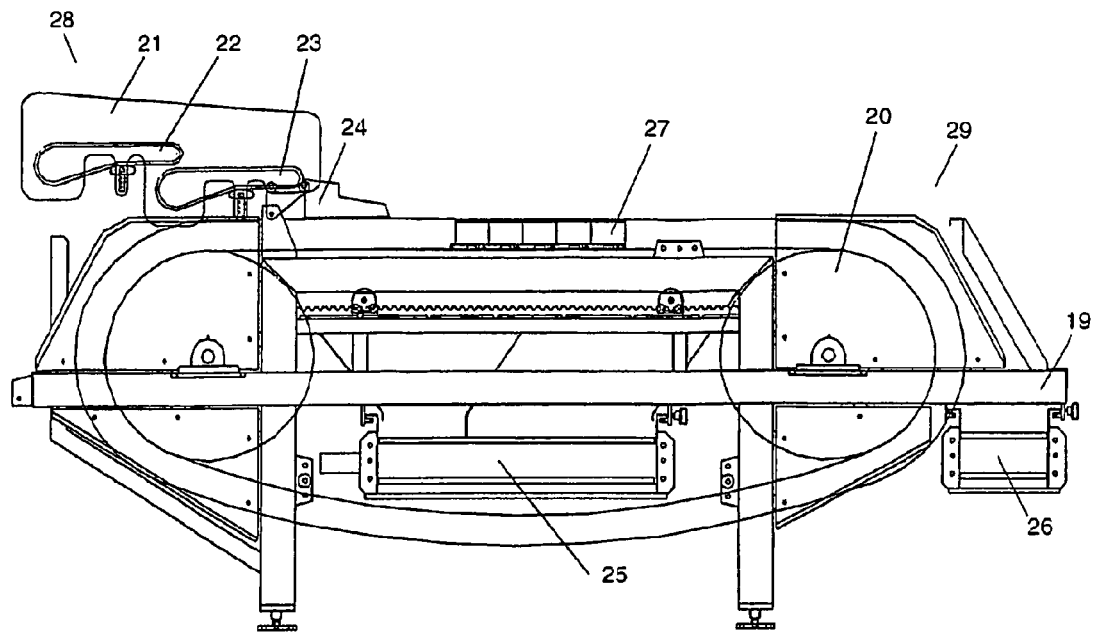
FIG. 7 is a side view of an apparatus of the invention.
Figure 8:
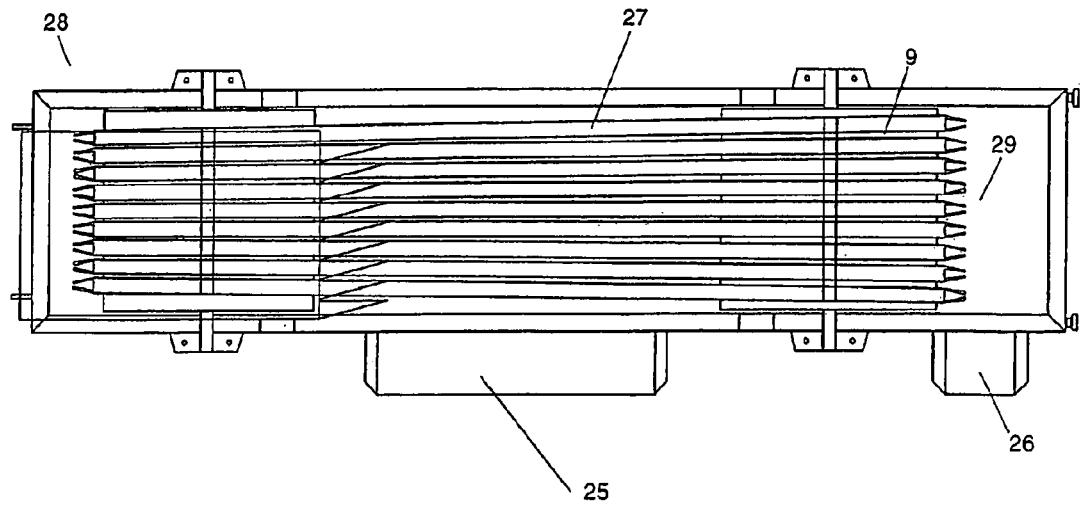
FIG. 8 is a top view of an apparatus of the invention.

FIG. 7 shows a side view of an apparatus of the invention, having a frame (19), wheels (20), infeeding means (21-24), and collecting means (25, 26). For simplicity only five ridge belt segments (1) are shown in the outer most ridge belt (27). FIG. 8 is a top view of the same apparatus, which has 9 ridge belts (27) but any desired number of belts can be used. A higher number of belts may require additions to the feeding means to ensure that the material to be sorted is distributed to all belts. It is shown that the sorting channels (9) are wider at the output end (29) than at the infeeding end (28). The collecting means (25) can be configured for different number of size grades, the output end collecting means (26) receive the items that are too large to fall through the sorting channels. In a sorting machine configured for items such as e.g. capelin, sardines or shrimp, a channel width starting in the range of about 5-10 mm can be used and ending at 15-25 mm, in a preferred embodiment with 5 m long conveyors, the sorting channels are about 8 mm wide at the infeeding end (28) and about 18 mm wide at the output end (29).

The infeeding means (21-24) ensure that the material to be sorted is evenly distributed in the sorting channels and is not placed on top of the ridge clefts (3) on the segments. Such infeeding means are described in detail in applicant's earlier application No. WO 03/043428 which is incorporated herein in full by reference.

An apparatus according to the present invention configured for capelin grading with 28 ridge belts can sort up to 30-40 tones per hour, and receives about 650 individual capelins per second. The accuracy of the grading is high such that the number of and under-size items in each size grade is minimized.

The invention claimed is:

1. A grading apparatus for grading items of seafood with respect to their size, said apparatus comprising a plurality of juxtaposed endless conveyor belts, each belt including an unloading end and a loading end, adjacent belts forming a width therebetween,
    wherein the width separating adjacent conveyor belts is larger at the unloading end than at the loading end of the belts, each conveyor belt having a cross-section with sloping sides such that in between each adjacent pair of belts is formed a sorting channel with substantially continuous sloping sides, each side being at an angle with respect to the axis of the belt in the range of about 70-85°, wherein each belt comprises a plurality of hinged segments forming said substantially continuous sloping sides, each of said hinged segments having an open cleft on a top of a ridge between the sloping sides of each segment.

2. The grading apparatus of claim 1, wherein each belt is a continuous elastic belt.

3. The grading apparatus of claim 1, wherein each of the continuously sloping sides has an angle in the range of about 70-80°.

4. The grading apparatus of claim 3, wherein each of the continuously sloping sides has an angle in the range of about 75-80°.

5. The grading apparatus of claim 3, wherein each of the continuously sloping sides has an angle of about 80°.

6. The grading apparatus of claim 1, wherein each cleft has a width in the range of about 3-10 mm.

7. The grading apparatus of claim 1, further comprising guiding means arranged by the loading end of the conveyor belts for guiding items of seafood to be graded to the channels in between adjacent belts and away from ridges and/or clefts on top of said hinged segments.

8. The use of an apparatus of any of claims 1-7 for the size grading of items.

9. The use of claim 8, wherein the items of seafood are selected from the group consisting of peeled or unpeeled shrimp tails, lobster tails, fish including capelin, sardine, herring, mackerel, horse mackerel, menhaden, anchovy, blue whiting, ocean perch, cod, pollock, haddock, oysters, clams and mussels.

10. A grading apparatus for grading items of seafood with respect to their size, said apparatus comprising a plurality of juxtaposed endless conveyor belts, each belt including an unloading end and a loading end, adjacent belts forming a width therebetween, wherein the width separating adjacent conveyor belts is larger at the unloading end than at the loading end of the belts, each conveyor belt having a substantially U-shaped cross-section with sloping sides such that in between each adjacent pair of belts is formed a sorting channel with substantially continuous sloping sides, wherein each conveyor belt comprises a plurality of hinged segments having a substantially U-shaped cross-section with sloping sides forming said substantially continuous sloping sides and a bottom portion forming an angle in the range of about 70-85° with each sloping side, each of said hinged segments having an open cleft between the sloping sides of each segment.

11. The grading apparatus of claim 10, wherein the open cleft is on a top of a ridge between the sloping side of each hinged segment.

* * * * *